(12) United States Patent
Wakimoto et al.

(10) Patent No.: US 12,496,758 B2
(45) Date of Patent: Dec. 16, 2025

(54) MULTI-STAGE HELICAL GEAR MANUFACTURING APPARATUS AND MULTI-STAGE HELICAL GEAR MANUFACTURING METHOD

(71) Applicant: TOYOTA BOSHOKU KABUSHIKI KAISHA, Aichi-ken (JP)

(72) Inventors: Yuki Wakimoto, Nagoya (JP); Yuta Sakaguchi, Konan (JP); Rikiya Suenaga, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 13 days.

(21) Appl. No.: 18/385,438

(22) Filed: Oct. 31, 2023

(65) Prior Publication Data

US 2024/0149512 A1 May 9, 2024

(30) Foreign Application Priority Data

Nov. 8, 2022 (JP) ................. 2022-178925

(51) Int. Cl.
| | | |
|---|---|---|
| *B29C 45/44* | (2006.01) | |
| *B29C 45/26* | (2006.01) | |
| *B29L 15/00* | (2006.01) | |

(52) U.S. Cl.
CPC .......... *B29C 45/44* (2013.01); *B29C 45/2681* (2013.01); *B29C 2045/445* (2013.01); *B29L 2015/003* (2013.01)

(58) Field of Classification Search
CPC ................ B29C 45/44; B29C 45/2681; B29C 2045/445; B29L 2015/003
See application file for complete search history.

(56) References Cited

U.S. PATENT DOCUMENTS

| | | | | |
|---|---|---|---|---|
| 2002/0098260 A1* | 7/2002 | Joung | ................. | B29C 45/2681 |
| | | | | 425/418 |
| 2002/0098261 A1* | 7/2002 | Joung | ................. | B29C 45/2681 |
| | | | | 425/418 |

FOREIGN PATENT DOCUMENTS

| | | | | | |
|---|---|---|---|---|---|
| FR | 2588503 A | * | 4/1987 | ............. | B29C 33/44 |
| JP | 2005-34311 | | 2/2005 | | |
| KR | 2002061995 A | * | 7/2002 | ......... | B29C 45/2681 |
| KR | 2002061996 A | * | 7/2002 | ............. | B29C 45/26 |

* cited by examiner

*Primary Examiner* — Christina A Johnson
*Assistant Examiner* — Xue H Liu
(74) *Attorney, Agent, or Firm* — Greenblum & Bernstein, P.L.C.

(57) ABSTRACT

A multi-stage helical gear manufacturing apparatus includes a first mold member, a second mold member, a large gear rotation core, a sleeve pin, a small gear rotation insert, and an insert pin. The second mold member moves the insert pin and the small gear rotation insert after the insert pin is caused to retreat in relation to the small gear rotation insert at the time of mold opening. The first mold member prohibits rotation of the large gear rotation core at the time of mold clamping, permits rotation of the large gear rotation core when the insert pin and the small gear rotation insert of the second mold member are moved at the time of mold opening, and causes the sleeve pin to advance toward the second mold member in relation to the plastic after the insert pin and the small gear rotation insert are separated from the plastic.

5 Claims, 5 Drawing Sheets

MULTI-STAGE HELICAL GEAR MANUFACTURING APPARATUS AND MULTI-STAGE HELICAL GEAR MANUFACTURING METHOD

BACKGROUND

1. Field

The present disclosure relates to a multi-stage helical gear manufacturing apparatus and a multi-stage helical gear manufacturing method.

2. Description of Related Art

As disclosed in Japanese Laid-Open Patent Publication No. 2005-34311, when a plastic product is manufactured by injection molding, a plastic is injected into a cavity between a first mold member and a second mold member that are clamped. Thereafter, when the first mold member and the second mold member are opened, the product formed of the plastic is removed.

It is desired to manufacture a multi-stage helical gear, which will be discussed below, through the above-described injection molding. The multi-stage helical gear includes a large gear and a small gear arranged on the same axis. First helical teeth are formed on the outer circumferential surface of the large gear. Second helical teeth are formed on the outer circumferential surface of the small gear. The second helical teeth have an inclination different from that of the first helical teeth of the large gear. The multi-stage helical gear includes a center hole extending along the center line of the large gear and the small gear. A linear spline extending along the center line is formed on the inner circumferential surface of the center hole.

Since the injection molding described in the above publication is for manufacturing a product having a relatively simple shape such as a worm wheel, the first mold member and the second mold member for manufacturing the product also have relatively simple structures. Accordingly, the technology described in the above publication cannot readily accommodate the manufacturing of a multi-stage helical gear with complex shapes such as first helical teeth, second helical teeth, a central hole, and a spline.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a multi-stage helical gear manufacturing apparatus manufactures a multi-stage helical gear including a large gear and a small gear arranged on a same axis. The multi-stage helical gear includes a center hole extending along a center line of the large gear and the small gear. A linear spline extending along the center line is formed on an inner circumferential surface of the center hole. First helical teeth are formed on an outer circumferential surface of the large gear. Second helical teeth are formed on an outer circumferential surface of the small gear. The second helical teeth have an inclination different from that of the first helical teeth of the large gear. The multi-stage helical gear manufacturing apparatus includes a first mold member a second mold member, a large gear rotation core, a sleeve pin, a small gear rotation insert, and an insert pin. The multi-stage helical gear manufacturing apparatus is configured to inject a plastic into a cavity between the first mold member and the second mold member when the first mold member and the second mold member are clamped, and then remove the multi-stage helical gear formed of the plastic when the first mold member and the second mold member are opened. The large gear rotation core forms the large gear and the first helical teeth. The large gear rotation core is rotatably supported by the first mold member. The sleeve pin forms the center hole and the spline. The sleeve pin is supported by the first mold member so as to advance and retreat in directions approaching and separating from the second mold member. The small gear rotation insert forms the small gear and the second helical teeth. The small gear rotation insert is rotatably supported by the second mold member. The insert pin is inserted into the small gear rotation insert. The insert pin is supported by the second mold member so as to advance and retreat in directions approaching and separating from the first mold member in relation to the small gear rotation insert. The cavity is formed between the first mold member and the second mold member by the large gear rotation core, the sleeve pin, the small gear rotation insert, and the insert pin at a time of mold clamping. When advancing in relation to the small gear rotation insert at the time of mold clamping, the insert pin prohibits the small gear rotation insert from rotating relative to the second mold member. When retreating in relation to the small gear rotation insert at a time of mold opening, the insert pin permits the small gear rotation insert to rotate relative to the second mold member. The second mold member is configured to move the insert pin and the small gear rotation insert away from the first mold member after the insert pin is caused to retreat in relation to the small gear rotation insert at the time of mold opening. The first mold member is configured to prohibit rotation of the large gear rotation core at the time of mold clamping, permit rotation of the large gear rotation core when the insert pin and the small gear rotation insert of the second mold member are moved away from the first mold member at the time of mold opening, and cause the sleeve pin to advance toward the second mold member in relation to the plastic after the movement of the insert pin and the small gear rotation insert away from the plastic.

In another general aspect, a multi-stage helical gear manufacturing method manufactures a multi-stage helical gear including a large gear and a small gear arranged on a same axis. The multi-stage helical gear includes a center hole extending along a center line of the large gear and the small gear. A linear spline extending along the center line is formed on an inner circumferential surface of the center hole. First helical teeth are formed on an outer circumferential surface of the large gear. Second helical teeth are formed on an outer circumferential surface of the small gear. The second helical teeth have an inclination different from that of the first helical teeth of the large gear. The multi-stage helical gear manufacturing method includes injecting a plastic into a cavity between a first mold member and a second mold member when the first mold member and the second mold member are clamped. The multi-stage helical gear manufacturing method also includes, after the injecting the plastic into the cavity, taking out the multi-stage helical gear formed of the plastic when the first mold member and the second mold member are opened. The first mold member rotatably supports a large gear rotation core for forming the large gear and the first helical teeth. The first mold member supports a sleeve pin for forming the center hole and the spline. The sleeve pin is permitted to advance and retreat in directions approaching and separating from the second mold member. The second mold member rotatably supports a small gear rotation insert for forming the small gear and the second helical teeth. The second mold member supports an insert pin inserted into the small gear rotation insert. The insert pin is permitted to advance and retreat in directions approaching and separating from the first mold member in relation to the small gear rotation insert. The cavity is formed between the first mold member and the second mold member by the large gear rotation core, the sleeve pin, the small gear rotation insert, and the insert pin at a time of mold clamping. When advancing in relation to the small gear rotation insert at the time of mold clamping, the insert pin prohibits the small gear rotation insert from rotating relative to the second mold member. When retreating in relation to the small gear rotation insert at a time of mold opening, the insert pin permits the small gear rotation insert to rotate relative to the second mold member. The multi-stage helical gear manufacturing method further includes: when the first mold member and the second mold member are opened, causing the insert pin to retreat in relation to the small gear rotation insert, thereby permitting the small gear rotation insert to rotate relative to the second mold member; moving the insert pin, which has been caused to retreat in relation to the small gear rotation insert, and the small gear rotation insert, which is permitted to rotate relative to the second mold member by the retreat of the insert pin, away from the first mold member; and after the moving the insert pin and the small gear rotation insert, permitting rotation of the large gear rotation core relative to the first mold member, which has been prohibited at the time of mold clamping, and causing the sleeve pin to advance toward the second mold member in relation to the plastic after the insert pin and the small gear rotation insert are separated from the plastic by the movement.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, propor-tions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A multi-stage helical gear manufacturing apparatus and a multi-stage helical gear manufacturing method according to an embodiment will now be described with reference to FIGS. 1 to 10.

Structure of Multi-Stage Helical Gear

Figure 1:
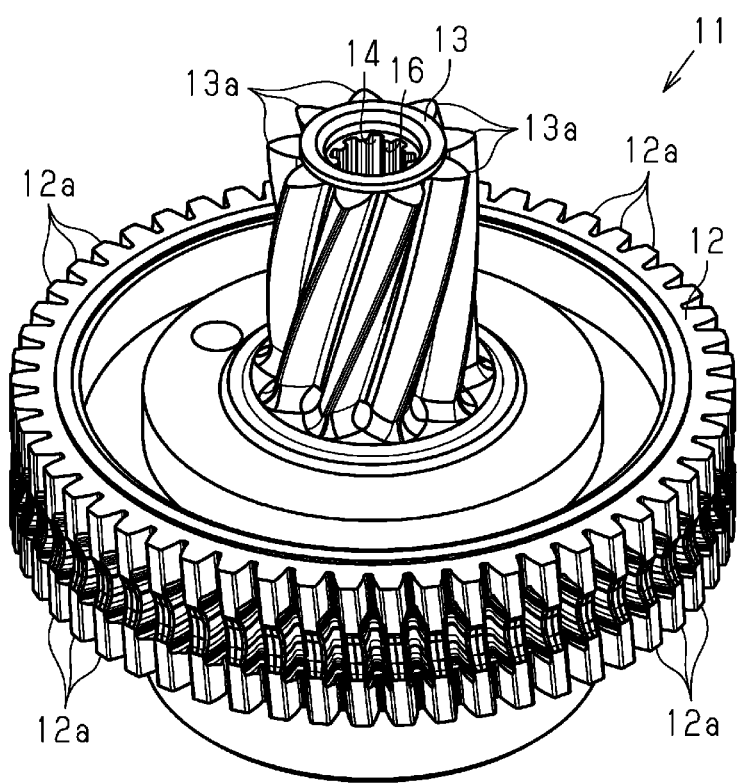
FIG. 1 is a perspective view of a multi-stage helical gear.
Figure 2:
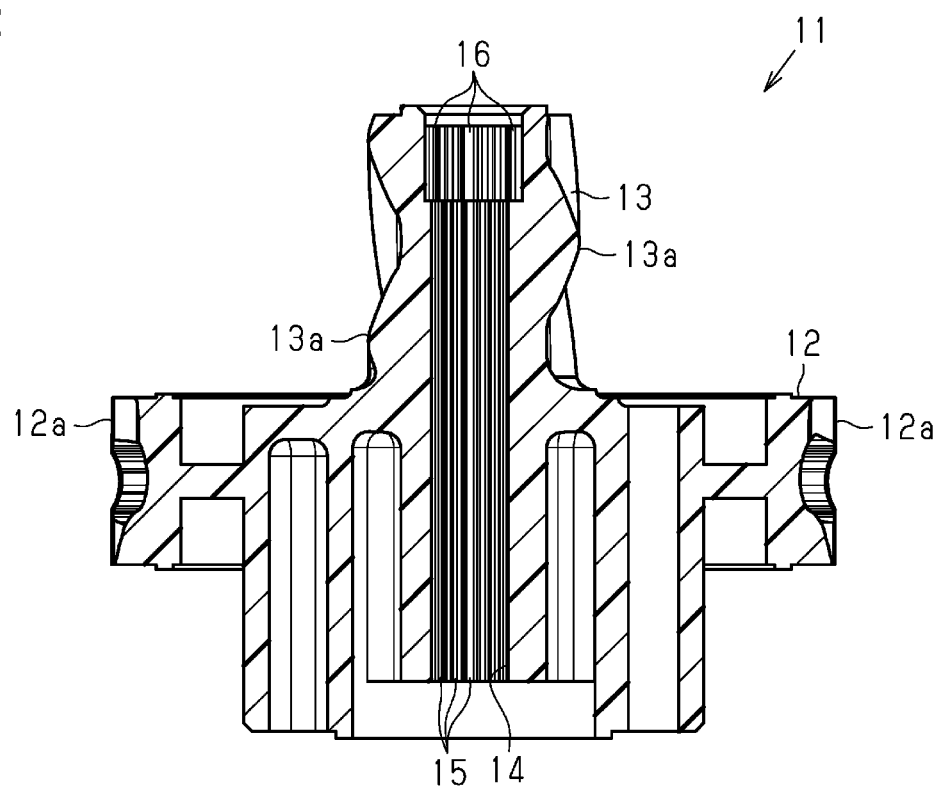
FIG. 2 is a cross-sectional view of the multi-stage helical gear shown in FIG. 1.

As shown in FIGS. 1 and 2, a multi-stage helical gear 11 is made of a plastic. The multi-stage helical gear 11 includes a large gear 12 (first gear) and a small gear 13 (second gear) arranged on the same axis. The large gear 12 includes a large number of first helical teeth 12a on the outer circumferential surface. The first helical teeth 12a are formed at intervals in the circumferential direction. The small gear 13 includes a large number of second helical teeth 13a on the outer circumferential surface. The second helical teeth 13a are formed at intervals in the circumferential direction. The inclination of the second helical teeth 13a is different from that of the first helical teeth 12a of the large gear 12.

The multi-stage helical gear 11 includes a center hole 14 extending along the center line of the large gear 12 and the small gear 13. Linear splines 15, 16 extending along the center line are formed on the inner circumferential surface of the center hole 14. The splines 15, 16 are formed at intervals in the circumferential direction. The splines 15 are formed on one side in a direction in which the center line of the center hole 14 extends. The splines 16 are formed on a side opposite to the splines 15 in the direction in which the center line of the center hole 14 extends.

Multi-Stage Helical Gear Manufacturing Apparatus

FIGS. 3 to 7 schematically show a manufacturing apparatus 21 for manufacturing a multi-stage helical gear through injection molding. The manufacturing apparatus 21 shown in FIG. 3 includes a first mold member 22 and a second mold member 23, which are divided at a parting line (PL).

Figure 3:
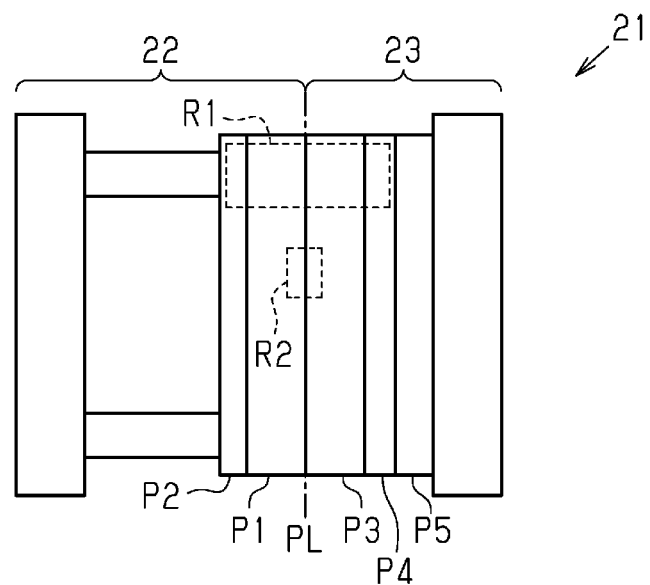
FIG. 3 is a schematic diagram showing a manufacturing apparatus for manufacturing the multi-stage helical gear.

FIG. 3 shows the manufacturing apparatus 21 when the first mold member 22 and the second mold member 23 are clamped. When the first mold member 22 and the second mold member 23 are opened, the manufacturing apparatus 21 operates in the sequence of FIG. 3, FIG. 4, FIG. 5, FIG. 6, and FIG. 7. When the opened first mold member 22 and second mold member 23 are clamped, the manufacturing apparatus 21 operates in the sequence of FIG. 7, FIG. 6, FIG. 5, FIG. 4, and FIG. 3.

When the multi-stage helical gear 11 made of plastic is manufactured by the manufacturing apparatus 21, molten plastic is injected into a cavity between the first mold member 22 and second mold member 23, which are clamped. Thereafter, when the first mold member 22 and the second mold member 23 are opened, the multi-stage helical gear 11, which is formed of the cured plastic, is removed.

The first mold member 22 is provided with a first plate P1 and a second plate P2, which are arranged in this order in a direction away from the second mold member 23. The second mold member 23 is provided with a third plate P3, a fourth plate P4, and a fifth plate P5, which are arranged in this order in a direction away from the first mold member 22. The first plate P1, the second plate P2, the third plate P3, the fourth plate P4, and the fifth plate P5 come into contact with each other when the first mold member 22 and the second mold member 23 are clamped.

The manufacturing apparatus 21 is configured such that a spring load N1 acts between the third plate P3 and the fourth plate P4 in the second mold member 23 in a direction separating the third plate P3 and the fourth plate P4 away from each other. Also, the manufacturing apparatus 21 is configured such that a spring load N2 acts between the fourth plate P4 and the fifth plate P5 in the second mold member 23 in a direction separating the fourth plate P4 and the fifth plate P5 away from each other.

Figure 6:
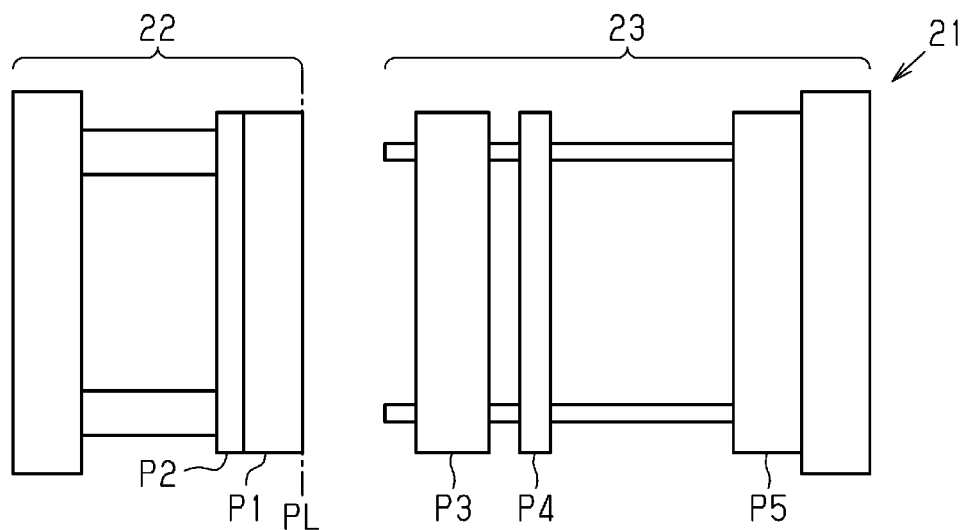
FIG. 6 is a schematic diagram showing the mold opening process of the manufacturing apparatus.

The first mold member 22 and the second mold member 23 are provided with a first lock mechanism R1 capable of locking and releasing the first plate P1 and the second plate P2. The first lock mechanism R1 is urged by a spring so as to lock the first plate P1 and the second plate P2 when the first mold member 22 and the second mold member 23 are clamped. When the first mold member 22 and the second mold member 23 are opened and the third plate P3 is separated from the first plate P1 as shown in FIG. 6, the first lock mechanism R1 releases the first plate P1 and the second plate P2 against the urging force of the spring.

Figure 5:
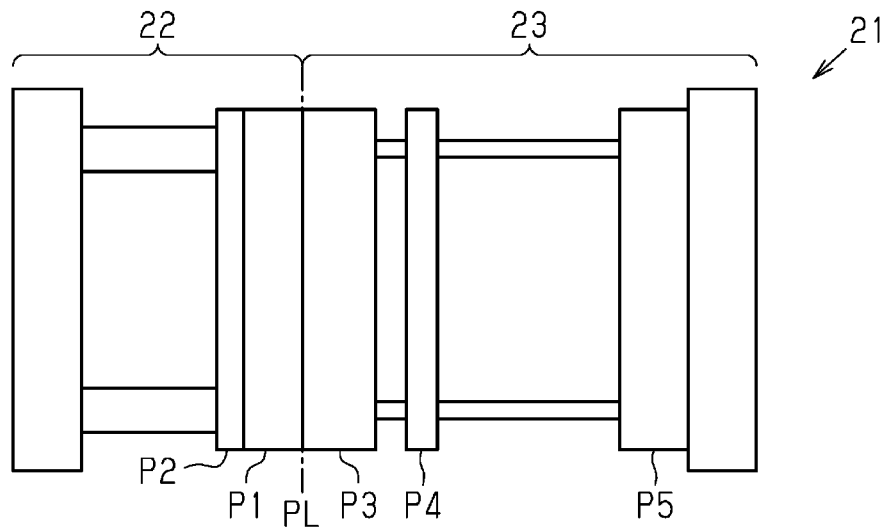
FIG. 5 is a schematic diagram showing the mold opening process of the manufacturing apparatus.

The first mold member 22 and the second mold member 23 are provided with a second lock mechanism R2 capable of locking and releasing the first plate P1 and the third plate P3. The second lock mechanism R2 is urged by a spring so as to lock the first plate P1 and the third plate P3 when the first mold member 22 and the second mold member 23 are clamped. When the first mold member 22 and the second mold member 23 are opened and the force that pushes the third plate P3 against the first plate P1 shown in FIG. 5 is reduced, the second lock mechanism R2 releases the first plate P1 and the third plate P3 against the urging force of the spring.

The first lock mechanism R1, the second lock mechanism R2, the spring load N1, and the spring load N2 of the manufacturing apparatus 21 are set such that the following actions (A) to (D) take place sequentially when the clamped first mold member 22 and second mold member 23 are opened.

Figure 4:
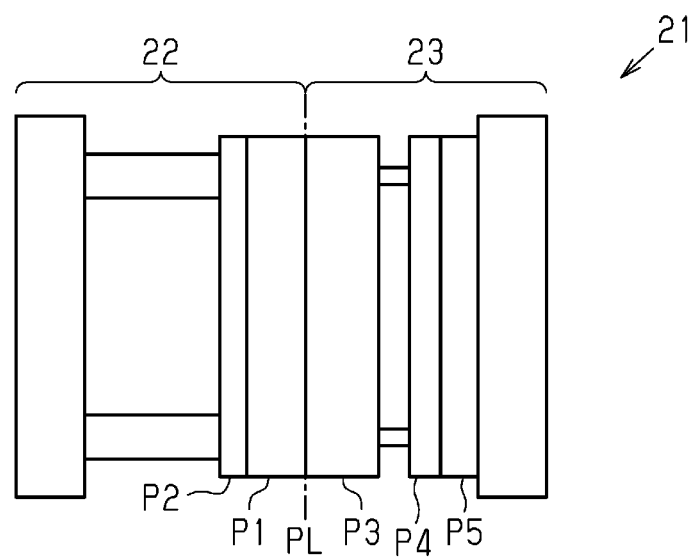
FIG. 4 is a schematic diagram showing a mold opening process of the manufacturing apparatus.
Figure 7:
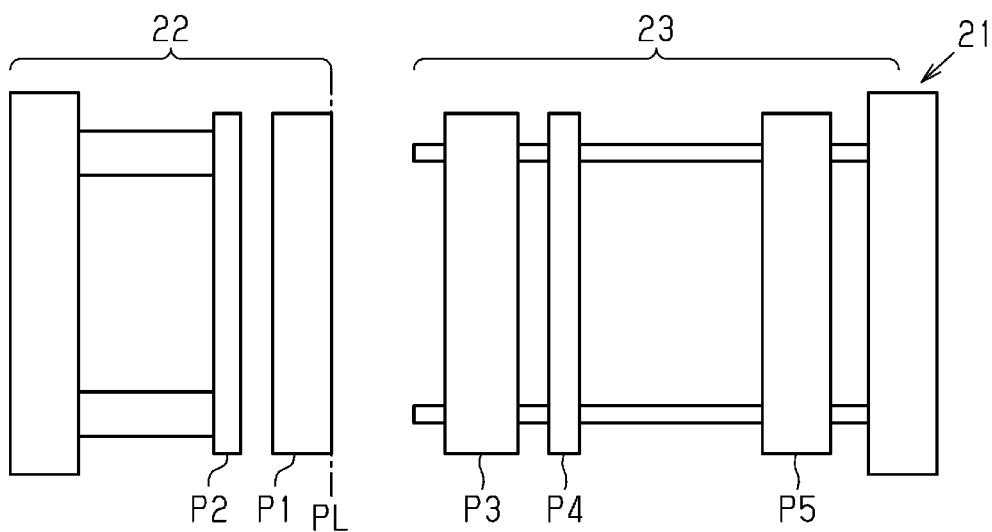
FIG. 7 is a schematic diagram showing the mold opening process of the manufacturing apparatus.

(A) As shown in FIGS. 3 and 4, the fourth plate P4 and the fifth plate P5 are separated from the third plate P3. (B) As shown in FIGS. 4 and 5, the fifth plate P5 is separated from the fourth plate P4. (C) As shown in FIGS. 5 and 6, the third plate P3, the fourth plate P4, and the fifth plate P5 are separated from the first plate P1. (D) As shown in FIGS. 6 and 7, the second plate P2 is separated from the first plate P1.

As a result, when the clamped first mold member 22 and second mold member 23 are opened, the first plate P1, the second plate P2, the third plate P3, the fourth plate P4, and the fifth plate P5 of the manufacturing apparatus 21 move in the sequence of FIG. 3, FIG. 4, FIG. 5, FIG. 6, and FIG. 7.

Next, the internal structure of the manufacturing apparatus 21 will be described.

Figure 8:
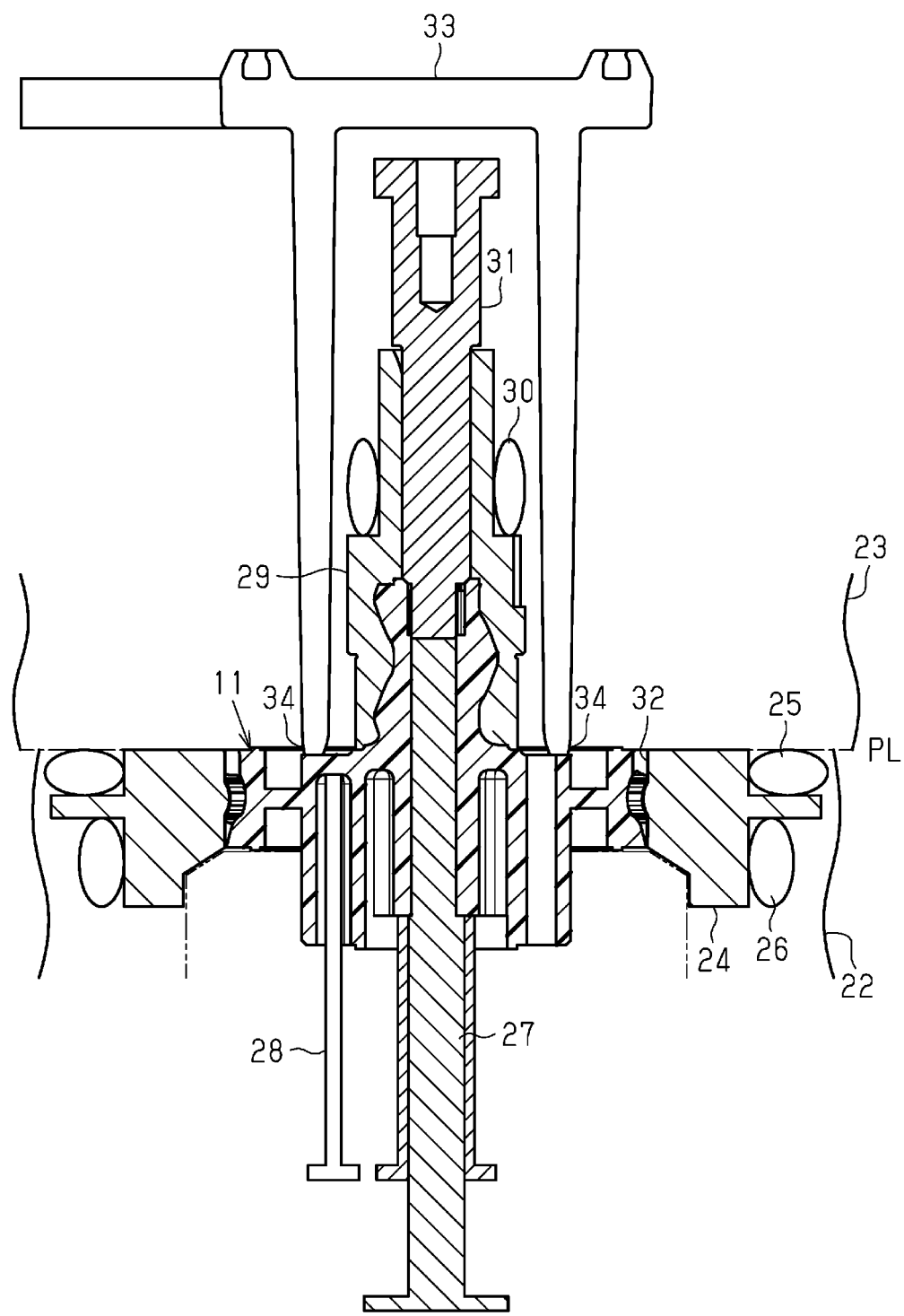
FIG. 8 is a cross-sectional view showing the internal structure of the manufacturing apparatus.

The first plate P1 (FIGS. 3 to 7) of the first mold member 22 shown in FIG. 8 rotatably supports a large gear rotation core 24 with bearings 25, 26. The large gear rotation core 24 is used to form the large gear 12 and the first helical teeth 12a of the multi-stage helical gear 11 shown in FIGS. 1 and 2.

The first mold member 22 supports a sleeve pin 27 and an ejector pin 28. The sleeve pin 27 is used to form the center hole 14 and the splines 15 of the multi-stage helical gear 11, and is supported by the first mold member 22 so as to be movable in directions toward and away from the second mold member 23. The ejector pin 28 is used to removed the multi-stage helical gear 11 formed of the plastic when the first mold member 22 and the second mold member 23 are opened. The ejector pin 28 is supported by the first mold member 22 so as to be movable in directions toward and away from the second mold member 23.

The second plate P2 (FIGS. 3 to 7) of the first mold member 22 is configured to prohibit rotation of the large gear rotation core 24 when coming contact with the first plate P1 at the time of mold clamping, and to permit rotation of the large gear rotation core 24 when being separated from the first plate P1 at the time of mold opening.

The third plate P3 (FIGS. 3 to 7) of the second mold member 23 shown in FIG. 8 rotatably supports a small gear rotation insert 29 with a bearing 30. The small gear rotation insert 29 is used to form the small gear 13 and the second helical teeth 13a of the multi-stage helical gear 11.

The fourth plate P4 (FIGS. 3 to 7) of the second mold member 23 supports an insert pin 31. The insert pin 31 is inserted into the small gear rotation insert 29. As the second plate P2 approaches or separates from the first plate P1, the insert pin 31 moves toward or away from the first mold member 22 in relation to the small gear rotation insert 29. The insert pin 31 comes into contact with the sleeve pin 27 when the first mold member 22 and the second mold member 23 are clamped. The insert pin 31 is used to form the center hole 14 and the splines 16 of the multi-stage helical gear 11.

The insert pin 31 prohibits or permits rotation of the small gear rotation insert 29 relative to the third plate P3 of the second mold member 23. Specifically, when advancing in relation to the small gear rotation insert 29 at the time of mold clamping, the insert pin 31 prohibits the small gear rotation insert 29 from rotating relative to the third plate P3 of the second mold member 23. When retreating in relation to the small gear rotation insert 29 at the time of mold opening, the insert pin 31 permits the small gear rotation insert 29 to rotate relative to the second mold member 23.

A cavity 32 is defined between the clamped first mold member 22 and second mold member 23 by the large gear rotation core 24, the sleeve pin 27, the small gear rotation insert 29, and the insert pin 31. At this time, the sleeve pin 27 and the insert pin 31 protrude into the cavity 32 and are in contact with each other. The fifth plate P5 (FIGS. 3 to 7) of the second mold member 23 is provided with runners 33 and gates 34 for injecting plastic into the cavity 32. At the time of mold clamping, molten plastic is injected into the cavity 32 from the runners 33 and the gates 34, and then, the plastic is cured to form the multi-stage helical gear 11.

Insert Pin 31 and Small Gear Rotation Insert 29

Figure 10:
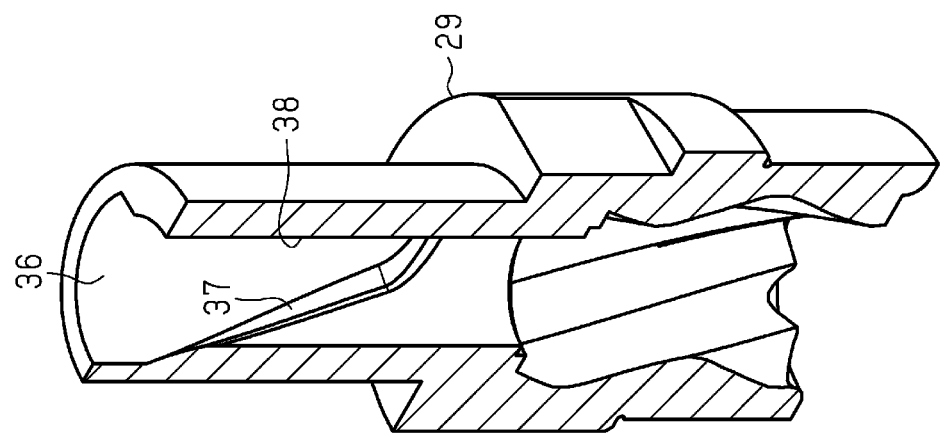
FIG. 10 is a perspective view, with a part cut away, showing a small gear rotation insert of the manufacturing apparatus.
Figure 9:
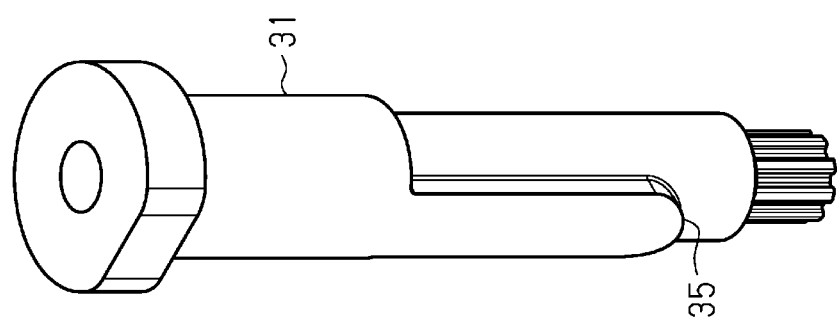
FIG. 9 is a perspective view of an insert pin of the manufacturing apparatus.

As shown in FIG. 9, the insert pin 31 includes a protrusion 35, which protrudes in a radial direction, on the outer circumferential surface. As shown in FIG. 10, an inner circumferential surface of the small gear rotation insert 29, into which the insert pin 31 is inserted, is provided with an accommodation groove 36 that accommodates the protrusion 35 when the insert pin 31 is inserted. The accommodation groove 36 includes a helical wall 37 and a vertical wall 38 and is wider than the protrusion 35 of the insert pin 31. The helical wall 37 extends helically along the inner circumferential surface of the small gear rotation insert 29. When the insert pin 31 is inserted into the small gear rotation insert 29, the protrusion 35 of the insert pin 31 comes into contact with the helical wall 37. The vertical wall 38 extends parallel to the center line of the small gear rotation insert 29. When the insert pin 31 is inserted deep into the small gear rotation insert 29, the vertical wall 38 comes into contact with the protrusion 35 together with the helical wall 37 to prohibit rotation of the small gear rotation insert 29 relative to the third plate P3 of the second mold member 23.

When the first mold member 22 and the second mold member 23 are clamped and the fourth plate P4 is in contact with the third plate P3, the insert pin 31 is inserted deep into the small gear rotation insert 29. Accordingly, the protrusion 35 of the insert pin 31 contacts both the helical wall 37 and the vertical wall 38 of the accommodation groove 36 of the small gear rotation insert 29. This prohibits rotation of the small gear rotation insert 29 relative to the third plate P3 of the second mold member 23. When the first mold member 22 and the second mold member 23 are opened, the fourth plate P4 is separated from the third plate P3. Accordingly, the insert pin 31 retreats in relation to the small gear rotation insert 29. This moves the protrusion 35 of the insert pin 31 to a wide section of the accommodation groove 36 of the small gear rotation insert 29. As a result, the small gear rotation insert 29 is permitted to rotate relative to the third plate P3 of the second mold member 23.

When the opened first mold member 22 and second mold member 23 are clamped, the fourth plate P4 approaches the third plate P3. Accordingly, the insert pin 31 advances in relation to the small gear rotation insert 29. Accordingly, the protrusion 35 of the insert pin 31 is pressed against the helical wall 37 of the accommodation groove 36 of the small gear rotation insert 29. As a result, the small gear rotation insert 29 rotates relative to the third plate P3 of the second mold member 23. When the insert pin 31 is inserted deep into the small gear rotation insert 29, the protrusion 35 of the insert pin 31 comes into contact with both the helical wall 37 and the vertical wall 38. This prohibits the small gear rotation insert 29 from rotating relative to the third plate P3 of the second mold member 23. At this time, the helical wall 37 and the vertical wall 38 in the accommodation groove 36 allow the rotational position of the small gear rotation insert 29 relative to the third plate P3 to be always constant at each mold clamping.

Multi-Stage Helical Gear Manufacturing Method

Next, a method of manufacturing the multi-stage helical gear 11 using the manufacturing apparatus 21 will be described.

In this manufacturing method, the first mold member 22 and the second mold member 23 are repeatedly clamped and opened. When the first mold member 22 and the second mold member 23 are clamped, a molten plastic is injected into the cavity 32 shown in FIG. 8 between the first mold member 22 and the second mold member 23 via the runners 33 and the gates 34. When the clamped first mold member 22 and second mold member 23 are opened, a first step, a second step, and a third step are performed.

In the first step, the above-described action (A) is performed in the manufacturing apparatus 21 shown in FIGS. 3 and 4, so that the fourth plate P4 and the fifth plate P5 are separated from the third plate P3 of the second mold member 23. As a result, the insert pin 31 retreats in relation to the small gear rotation insert 29 (FIG. 8). This permits the small gear rotation insert 29 to rotate relative to the third plate P3 of the second mold member 23. Further, the above-described action (B) is performed in the manufacturing apparatus 21 shown in FIGS. 4 and 5, so that the fifth plate P5 is separated from the fourth plate P4 of the second mold member 23. As a result, the runners 33 and the gates 34 (FIG. 8) are disconnected from the cavity 32 between the first mold member 22 and the second mold member 23.

After the execution of the first step, the second step is performed. In the second step, the above-described action (C) is performed in the manufacturing apparatus 21 shown in FIGS. 5 and 6, so that the third plate P3, the fourth plate P4, and the fifth plate P5 of the second mold member 23 are separated from the first plate P1 of the first mold member 22. As a result, the insert pin 31 and the small gear rotation insert 29 shown in FIG. 8 move away from the first mold member 22. At this time, the small gear rotation insert 29 is removed from the plastic in the cavity 32 while rotating relative to the third plate P3 of the second mold member 23.

The actions (A) and (B) of the manufacturing apparatus 21 in the first step and the second step cause the insert pin 31 to retreat in relation to the small gear rotation insert 29 at the time of mold opening. Thereafter, the insert pin 31 and the small gear rotation insert 29 move away from the first mold member 22. That is, the first mold member 22 is configured to move the insert pin 31 and the small gear rotation insert 29.

After the of the second step, the third step is performed. In the third step, the above-described action (D) is performed in the manufacturing apparatus 21 shown in FIGS. 6 and 7, so that the second plate P2 is separated from the first plate P1 of the first mold member 22. This allows for rotation of the large gear rotation core 24 relative to the first plate P1 of the first mold member 22, which has been prohibited at the time of mold clamping. That is, the first mold member 22 is configured to prohibit rotation of the large gear rotation core 24 at the time of mold clamping. Further, the first mold member 22 is configured to allow for rotation of the large gear rotation core 24 when the insert pin 31 and the small gear rotation insert 29 of the second mold member 23 move away from the first mold member 22 at the time of mold opening.

In the third step, the sleeve pin 27 (FIG. 8) advances toward the second mold member 23 in relation to the plastic after the insert pin 31 and the small gear rotation insert 29 are separated from the plastic in the cavity 32 by the movement in the second step. That is, the first mold member 22 is configured to cause the sleeve pin 27 to advance toward the second mold member 23 in relation to the plastic after the insert pin 31 and the small gear rotation insert 29 are separated from the plastic in the cavity 32 by the movement in the second step. As a result, the multi-stage helical gear 11, which is formed of the plastic, is removed while the large gear rotation core 24 is rotated relative to the first plate P1 of the first mold member 22.

Further, the ejector pin 28 advances further toward the second mold member 23 than the sleeve pin 27 (FIG. 8). This removes the multi-stage helical gear 11 from the sleeve pin 27.

The present embodiment, as described above, has the following operational advantages.

(1) When the first mold member 22 and the second mold member 23 are clamped, a molten plastic is injected into the cavity 32 between the first mold member 22 and the second mold member 23. At this time, rotation of the large gear rotation core 24 relative to the first plate P1 of the first mold member 22 is prohibited. Also, rotation of the small gear rotation insert 29 relative to the third plate P3 of the second mold member 23 is prohibited by the insert pin 31. When the first mold member 22 and the second mold member 23 are opened, the insert pin 31 first retreats in relation to the small gear rotation insert 29, which allows rotation of the small gear rotation insert 29 relative to the third plate P3 of the second mold member 23. Thereafter, when the insert pin 31 and the small gear rotation insert 29 are moved away from the first mold member 22, the small gear rotation insert 29 is removed from the plastic in the cavity 32 while being rotated relative to the third plate P3 of the first mold member 22. When the insert pin 31 and the small gear rotation insert 29 move away from the first mold member 22, rotation of the large gear rotation core 24 relative to the first plate P1 of the first mold member 22 is permitted. Then, after the small gear rotation insert 29 is removed from the plastic in the cavity 32, the sleeve pin 27 advances toward the second mold member 23 in relation to the plastic. As a result, the multi-stage helical gear 11, which is formed of the plastic, is removed while the large gear rotation core 24 is rotated relative to the first plate P1 of the first mold member 22. The multi-stage helical gear 11 is thus manufactured.

(2) When the first mold member 22 and the second mold member 23 are clamped, the sleeve pin 27 and the insert pin 31 protrude into the cavity 32 between the first mold member 22 and the second mold member 23. At this time, the insert pin 31 is in contact with the sleeve pin 27. The splines 15 are formed in the center hole 14 of the multi-stage helical gear 11, which is formed by injecting plastic into the cavity 32, by the sleeve pin 27. Also, the splines 16 are formed by the insert pin 31. Therefore, the splines 15, 16 formed in the center hole 14 of the multi-stage helical gear 11 are divided into two types, i.e., the splines formed by the sleeve pin 27 and the splines formed by the insert pin 31.

(3) When the first mold member 22 and the second mold member 23 are clamped, and the insert pin 31 is inserted deep into the small gear rotation insert 29, the protrusion 35 of the insert pin 31 comes into contact with both the helical wall 37 and the vertical wall 38 in the accommodation groove 36 of the small gear rotation insert 29. This prohibits rotation of the small gear rotation insert 29 relative to the third plate P3 of the second mold member 23. When the first mold member 22 and the second mold member 23 are opened, the insert pin 31 retreats in relation to the small gear rotation insert 29, so that the protrusion 35 of the insert pin 31 moves to a section wider than the deep section in the accommodation groove 36 of the small gear rotation insert 29. This permits the small gear rotation insert 29 to rotate relative to the third plate P3 of the second mold member 23. When the opened first mold member 22 and second mold member 23 are clamped, the insert pin 31 advances in relation to the small gear rotation insert 29, so that the protrusion 35 of the insert pin 31 is pressed against the helical wall 37 in the accommodation groove 36 of the small gear rotation insert 29. As a result, the small gear rotation insert 29 rotates relative to the third plate P3 of the second mold member 23. When the insert pin 31 is inserted deep into the small gear rotation insert 29, the protrusion 35 of the insert pin 31 comes into contact with the helical wall 37 and the vertical wall 38 in the accommodation groove 36, which prohibits rotation of the small gear rotation insert 29 relative to the third plate P3 of the second mold member 23. At this time, the helical wall 37 and the vertical wall 38 in the accommodation groove 36 allow the rotational position of the small gear rotation insert 29 relative to the third plate P3 of the second mold member 23 to be always constant at each mold clamping. This improves the manufacturing accuracy of the multi-stage helical gear 11.

The above-described embodiment may be modified as follows.

The multi-stage helical gear 11 may include only the splines 15 in the center hole 14. In this case, when the first mold member 22 and the second mold member 23 of the manufacturing apparatus 21 are clamped, the insert pin 31 is prevented from protruding into the cavity 32, and the sleeve pin 27 is brought into contact with the insert pin 31 in the cavity 32.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A multi-stage helical gear manufacturing apparatus for manufacturing a multi-stage helical gear including a first gear and a second gear arranged on a same axis, wherein
the multi-stage helical gear includes a center hole extending along a center line of the first gear and the second gear,
a linear spline extending along the center line is formed on an inner circumferential surface of the center hole,
first helical teeth are formed on an outer circumferential surface of the first gear, and
second helical teeth are formed on an outer circumferential surface of the second gear, the second helical teeth having an inclination different from that of the first helical teeth of the first gear,
the multi-stage helical gear manufacturing apparatus comprises:
a first mold member and a second mold member, the multi-stage helical gear manufacturing apparatus being configured to inject a plastic into a cavity between the first mold member and the second mold member when the first mold member and the second mold member are clamped, and then remove the multi-stage helical gear formed of the plastic when the first mold member and the second mold member are opened;
a first gear rotation core for forming the first gear and the first helical teeth, the first gear rotation core being rotatably supported by the first mold member;
a sleeve pin for forming the center hole and the spline, the sleeve pin being supported by the first mold member so as to advance and retreat in directions approaching and separating from the second mold member;

a second gear rotation insert for forming the second gear and the second helical teeth, the second gear rotation insert being rotatably supported by the second mold member; and an insert pin inserted into the second gear rotation insert, the insert pin being supported by the second mold member so as to advance and retreat in directions approaching and separating from the first mold member in relation to the second gear rotation insert, the cavity is formed between the first mold member and the second mold member by the first gear rotation core, the sleeve pin, the second gear rotation insert, and the insert pin at a time of mold clamping, when advancing in relation to the second gear rotation insert at the time of mold clamping, the insert pin prohibits the second gear rotation insert from rotating relative to the second mold member, when retreating in relation to the second gear rotation insert at a time of mold opening, the insert pin permits the second gear rotation insert to rotate relative to the second mold member, the second mold member is configured to move the insert pin and the small second gear rotation insert away from the first mold member after the insert pin is caused to retreat in relation to the second gear rotation insert at the time of mold opening, and the first mold member is configured to
  prohibit rotation of the first gear rotation core at the time of mold clamping,
  permit rotation of the first gear rotation core when the insert pin and the small second gear rotation insert of the second mold member are moved away from the first mold member at the time of mold opening, and
  cause the sleeve pin to advance toward the second mold member in relation to the plastic after the movement of the insert pin and the second gear rotation insert away from the plastic.

2. The multi-stage helical gear manufacturing apparatus according to claim 1, wherein
  the first mold member is provided with a first plate and a second plate arranged in this order in a direction away from the second mold member,
  the first plate rotatably supports the first gear rotation core,
  the second plate
    prohibits rotation of the first gear rotating core when contacting the first plate, and
    permits rotation of the first gear rotation core when separated from the first plate,
  the second mold member is provided with a third plate, a fourth plate, and a fifth plate arranged in this order in a direction away from the first mold member,
  the third plate rotatably supports the second gear rotation insert,
  the fourth plate supports the insert pin,
  the fifth plate is provided with a runner and a gate for injecting the plastic into the cavity,
  a spring load N1 acts between the third plate and the fourth plate in the second mold member,
  a spring load N2 acts between the fourth plate and the fifth plate in the second mold member,
  the first plate, the second plate, the third plate, the fourth plate, and the fifth plate come into contact with each other when the first mold member and the second mold member are clamped,
  the first mold member and the second mold member are provided with:
    a first lock mechanism capable of locking and releasing the first plate and the second plate; and
    a second lock mechanism capable of locking and releasing the first plate and the third plate, and
  the first lock mechanism, the second lock mechanism, the spring load N1, and the spring load N2 are set such that, when the first mold member and the second mold member are opened, the first plate, the second plate, the third plate, the fourth plate, and the fifth plate are moved to cause separations between the plates to occur in an order of a separation of the fourth plate and the fifth plate from the third plate, a separation of the fifth plate from the fourth plate, a separation of the third plate, the fourth plate, and the fifth plate from the first plate, and a separation of the second plate from the first plate.

3. The multi-stage helical gear manufacturing apparatus according to claim 1, wherein
  the insert pin protrudes into the cavity and comes into contact with the sleeve pin when the first mold member and the second mold member are clamped, and
  the insert pin forms the center hole and the spline of the multi-stage helical gear at a portion protruding into the cavity.

4. The multi-stage helical gear manufacturing apparatus according to claim 1, wherein
  the insert pin includes a protrusion on an outer circumferential surface, the protrusion protruding in a radial direction,
  an inner circumferential surface of the second gear rotation insert into which the insert pin is inserted is provided with an accommodation groove that accommodates the protrusion when the insert pin is inserted,
  the accommodation groove includes a helical wall and a vertical wall and is wider than the protrusion of the insert pin,
  the helical wall extends helically along an inner circumferential surface of the second gear rotation insert and comes into contact with the protrusion of the insert pin when the insert pin is inserted into the second gear rotation insert, and
  when the insert pin is inserted deep into the second gear rotation insert, the vertical wall comes into contact with the protrusion together with the helical wall to prohibit rotation of the second gear rotation insert relative to the second mold member.

5. A multi-stage helical gear manufacturing method for manufacturing a multi-stage helical gear including a first gear and a second gear arranged on a same axis, wherein
  the multi-stage helical gear includes a center hole extending along a center line of the first gear and the second gear,
  a linear spline extending along the center line is formed on an inner circumferential surface of the center hole,
  first helical teeth are formed on an outer circumferential surface of the first gear,
  second helical teeth are formed on an outer circumferential surface of the second gear, the second helical teeth having an inclination different from that of the first helical teeth of the first gear,
  the multi-stage helical gear manufacturing method comprises:
    injecting a plastic into a cavity between a first mold member and a second mold member when the first mold member and the second mold member are clamped; and after the injecting the plastic into the cavity, taking out the multi-stage helical gear formed of the plastic when the first mold member and the second mold member are opened, the first mold member rotatably supports a first gear rotation core for forming the first gear and the first helical teeth, the first mold member supports a sleeve pin for forming the center hole and the spline, the sleeve pin being permitted to advance and retreat in directions approaching and separating from the second mold member, the second mold member rotatably supports a second gear rotation insert for forming the second gear and the second helical teeth, the second mold member supports an insert pin inserted into the second gear rotation insert, the insert pin being permitted to advance and retreat in directions approaching and separating from the first mold member in relation to the second gear rotation insert, the cavity is formed between the first mold member and the second mold member by the first gear rotation core, the sleeve pin, the second gear rotation insert, and the insert pin at a time of mold clamping, when advancing in relation to the second gear rotation insert at the time of mold clamping, the insert pin prohibits the second gear rotation insert from rotating relative to the second mold member, when retreating in relation to the second gear rotation insert at a time of mold opening, the insert pin permits the second gear rotation insert to rotate relative to the second mold member, and the multi-stage helical gear manufacturing method further comprises:

when the first mold member and the second mold member are opened, causing the insert pin to retreat in relation to the second gear rotation insert, thereby permitting the second gear rotation insert to rotate relative to the second mold member;

moving the insert pin, which has been caused to retreat in relation to the second gear rotation insert, and the second gear rotation insert, which is permitted to rotate relative to the second mold member by the retreat of the insert pin, away from the first mold member; and after the moving the insert pin and the second gear rotation insert, permitting rotation of the first gear rotation core relative to the first mold member, which has been prohibited at the time of mold clamping, and causing the sleeve pin to advance toward the second mold member in relation to the plastic after the insert pin and the second gear rotation insert are separated from the plastic by the movement.

* * * * *